United States Patent [19]
Bu et al.

[11] Patent Number: 5,674,007
[45] Date of Patent: Oct. 7, 1997

[54] METHOD FOR CALCULATING PMV OF AIR CONDITIONING SYSTEM

[75] Inventors: Jong Uk Bu; Young Cho Shim, both of Seoul, Rep. of Korea

[73] Assignee: LG Electronics Inc., Seoul, Rep. of Korea

[21] Appl. No.: 401,208

[22] Filed: Mar. 9, 1995

[30] Foreign Application Priority Data

Mar. 9, 1994 [KR] Rep. of Korea ............... 4578/1994

[51] Int. Cl.$^6$ .................... G01K 13/00; G06F 15/00
[52] U.S. Cl. ............... 374/45; 374/109; 364/557; 364/505; 236/91 C
[58] Field of Search ............ 374/109, 45; 364/557, 364/505; 236/91 C

[56] References Cited

U.S. PATENT DOCUMENTS

| | | | |
|---|---|---|---|
| 3,751,634 | 8/1973 | Madsen | 219/501 |
| 5,170,935 | 12/1992 | Federspiel et al. | 364/557 |
| 5,291,748 | 3/1994 | Ueda | 236/78 D |
| 5,333,953 | 8/1994 | Kon | 374/109 |
| 5,374,123 | 12/1994 | Bu | 374/109 |
| 5,436,852 | 7/1995 | Kon | 374/109 |

FOREIGN PATENT DOCUMENTS 0495118  7/1992  European Pat. Off. ......... 374/109

OTHER PUBLICATIONS

ANSI/ASHRAE Standard 55-1981, pp. 1, 2, 4, 7, 8, 10, 15 & 16 (1981).

*Primary Examiner*—Diego F.F. Gutierrez
*Attorney, Agent, or Firm*—John P. White

[57] ABSTRACT

A method for calculating a PMV for an air conditioning system having a body sensor and a temperature sensor includes the steps of sensing a thermal change a human body senses due to room air circulation using the body sensor, and converting the sensed thermal change into a digital value, sensing a room temperature using the temperature sensor, and converting the sensed room temperature into a digital value, assigning parameters according to human bodily activities and amount of clothes a man wears classified by seasons and times, and calculating a PMV by computing the value of thermal change converted into a digital value, the value of room temperature converted into a digital value, and the parameters.

1 Claim, 3 Drawing Sheets

METHOD FOR CALCULATING PMV OF AIR CONDITIONING SYSTEM

BACKGROUND OF THE INVENTION

This invention relates to an air conditioning system, more particularly to a method for calculating a PMV of an air conditioning system, which detects a room temperature by means of a body sensor and a temperature sensor to calculate a PMV value.

In general, for an air conditioning system which serves to control room temperature, a technique for inferring human comfort is an important factor for achieving a comfortable room temperature.

Herein, besides physical factors such as room temperature, humidity, convection and radiation temperature, the sense of human comfort is influenced by 6 parameters including an amount of clothes a man wears and an amount of metabolism of the man.

As a method for quantifying the sense of comfort, a method for calculating a PMV has been widely used, which has been formulated by Fanger as follows.

$$PMV = (0.303\,e^{-2.1M} + 0.028)\{58.15(M-W) - 3.05 \times 10^{-3} \times \quad (1)$$
$$[5733 - 406.7(M-V) - Pa] - 24.42[(M-V) - 1] -$$
$$10^{-3} \times M(5867 - Pa) - 0.0814M(34 - ta) -$$
$$3.96 \times 10^{-8} \times f_{cl}[(t_{cl} + 273)^4 - (t_r + 273)^4] -$$
$$f_{cl} \times h_c(t_{cl} - t_a)\},$$

where $$t_{cl} = 35.7 - 1.628(M-V) - 0.155\,I_{cl}\{3.96 \times 10^{-8} \times \quad (2)$$
$$f_{cl}[(t_{cl} + 273)^4 - (t_r + 273)^4] -$$
$$f_{cl} \times h_c(t_{cl} - t_a)\}$$

$$h_c = 2.38(t_{cl} - t_a)^{0.25}, \quad (3)$$
$$\text{for } 2.38(t_{cl} - t_a)^{0.25} > 12.1\sqrt{V}$$

or $$= 12.1\sqrt{V}, \text{ for } 2.38(t_{cl} - t_a)^{0.25} < 12.1\sqrt{V} \quad (4)$$

$$f_{cl} = 1 + 0.2I_{cl}, \text{ for } I_{cl} < 0.5\,Clo \quad (5)$$

or $$= 1.05 + 0.1, \text{ for } I_{cl} > 0.5\,Clo \quad (6)$$

where,

PMV: Predicted Mean Vote,
M: Metabolism, met(1 met=58/m$^2$)
W: external activities("0" in most cases)
$I_{cl}$: resistivity coefficient of clothes, Clo (1 Clo=0.155 m$^2$ K/W)
$f_{cl}$: ratio of exposed surface area of a human body to the surface area of clothes.
ta: air temperature, C. deg.
$t_r$: mean radiation temperature, C. deg.
V: speed of air circulation, m/S
Pa: vapor pressure, Pa
$h_c$: convection heat transfer coefficient, W/m$^2$ K
$t_{cl}$: surface temperature of clothes, C. deg.

Herein, when the PMV is "zero" it indicates the most comfortable condition. The air conditioning region recommended by the ISO(International Standardization Organization) is, in general, −0.5<PMV<+0.5.

In case of managing an air conditioning system using such PMV values, there are the following two great difficulties.

First, there are difficulties in accurate detection of individual physical factors of temperature, humidity, air circulation and radiation temperature, with many sensors required for detecting each of the physical factors, individually.

Second, there is difficulty of calculating the detected ambient factors. When the above equations are used for calculating a PMV for a domestic air conditioner, there are many difficulties in calculating them when the entire system is not controlled using the same microcomputer.

Meantime, though present domestic air conditioners are provided with a neuro network technology for the PMV control, in-site measurement is still difficult.

SUMMARY OF THE INVENTION

The object of this invention is to provide a method for calculating a PMV using a body sensor and a thermistor temperature sensor.

This and other objects and features of this invention can be achieved by providing a method for calculating a PMV for an air conditioning system having sensors, including steps of sensing thermal change a human body senses due to room air circulation and converting the sensed thermal change into a digital value, sensing a room temperature and converting the sensed room temperature into a digital value, assigning parameters according to human bodily activities and amount of clothes a man wears classified by seasons and times, and calculating a PMV by computing the value of thermal change converted into a digital value, the value of room temperature converted into a digital value, and the parameters.

$$PMV = (a_1M + b_1C + c_1)ta - (a_2M + b_2C + c_2)S/100 - K \quad (7)$$

where,

M: metabolism, C: resistivity coefficient of clothes(Clo) value, ta: room temperature, S is an output of a body sensor, and a, b, c, and K are constants.

DETAILED DESCRIPTION OF THE INVENTION

Figure 1:
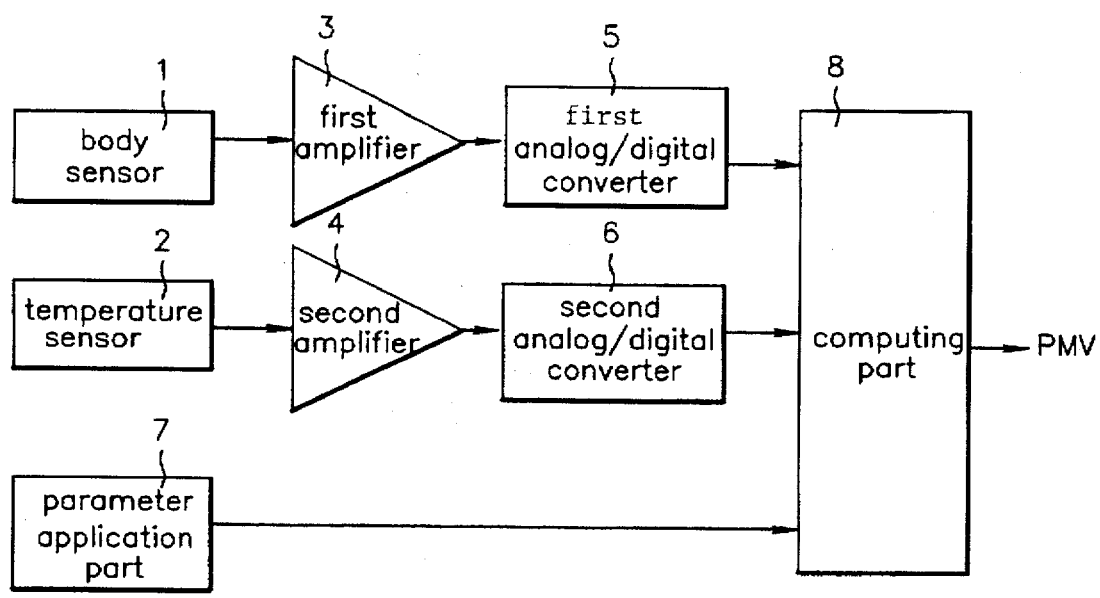
FIG. 1 is a block diagram of a PMV calculating instrument in accordance with this invention.

FIG. 1 is a block diagram of a PMV calculating instrument in accordance with this invention.

Referring to FIG. 1, a PMV measuring instrument of an air conditioning system in accordance with this invention, includes a body sensor 1 for measuring a thermal change of a human body due to a room thermal ambient, a temperature sensor 2 for sensing a room temperature, a first amplifier 3 for amplifying the output of the body sensor 1 to a certain amplitude, a second amplifier 4 for amplifying the output of the temperature sensor 2 to a certain amplitude, a first analog/digital converter 5 for converting an analog output of the first amplifier 3 into a digital output, a second analog/digital converter 6 for converting an analog output of the second amplifier 4 into a digital output, a parameter application part 7 for applying parameters for an amount of clothes a man wears and an amount of human activities, and a computing part 8 for computing a PMV value based on the outputs received from the first, and second analog/digital converters 5 and 6 and the parameter application part 7.

Figure 2:
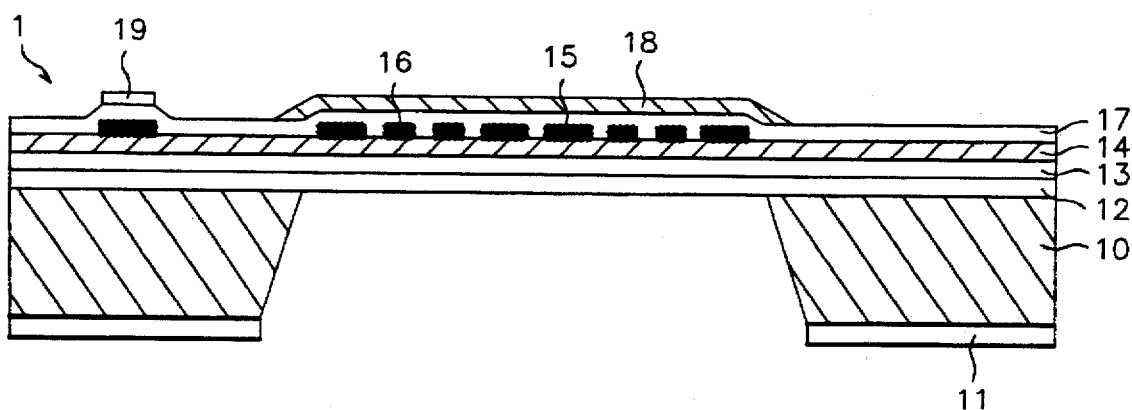
FIG. 2 is a section view of the body sensor of FIG. 1.

FIG. 2 is a section view of the body sensor of FIG. 1.

The body sensor of FIG. 2, being devised imitating the temperature controlling mechanism of a human body, is a sensor sensitively reacting to an air circulation.

The body sensor includes a $P^{++}$ layer 12 formed on a silicon substrate 10 having a membrane structure, an oxide film $SiO_2$ 13 and a nitride film $Si_3N_4$ 14 formed successively on the substrate, a heater 15, and a temperature sensor 16 for sensing the heat generated by the heater 15 formed on the nitride film, an oxide film 17 formed on the nitride film 14 including the heater 15 and the temperature sensor 16, a black body 18 formed on the oxide film 17 over the heater 15 and the temperature sensor 16, and an oxide film 11 formed at the back of the silicon substrate 10.

The oxide film 13 and the nitride film 14 act as insulation films, supporting films, and films for insulating the heat generated in the heater, the heater 15 and the temperature sensor 16 are formed on the supporting films spaced apart for a certain distance. The reference number 19 represents a pad.

The body sensor having the foregoing construction, being preset to generate a certain amount of heat, senses a thermal change a human body senses due to room thermal ambient. The temperature sensor 16 senses and outputs the thermal change due to the heat generated by the heater 15 at change of room thermal ambient. That is, of the body sensor 1, the heater 15, collectively reacting to a room thermal ambient, such as temperature, humidity, air circulation, and radiation temperatures, discharges heat to outside, and the temperature sensor 16 senses the thermal change of the heater 15 following such a thermal ambient of the heater. Therefore, an output of the body sensor 1 is a change of power applied to the body sensor when an amount of power corresponding to a thermal change of the heater 15 sensed by the temperature sensor 16 is supplied to the body sensor 1 for maintaining temperature of the heater 15 to a constant value.

The temperature sensor 16 of the body sensor 1 reacts to temperature, humidity, and air circulation, especially to the air circulation due to its construction.

Operation of the PMV measuring instrument having the foregoing construction is to be explained hereinafter, referring to FIGS. 3–5.

At operation of an air conditioning system, the body sensor 1 detects a room thermal ambient, wherein, as has been explained, the heater 15 of the body sensor 1 discharges heat corresponding to a change of room air circulation, and the temperature sensor 16 of the body sensor 1 senses the heat of the heater changing according to a room thermal ambient. On sensing thermal change of the heater, an amount of power as much as the sensed thermal change is supplied to the heater 15 for adjusting heat of the heater 15, and the body sensor 1 outputs an electrical signal corresponding to the changed amount power supplied in response to the thermal change.

The electrical signal from the body sensor 1 is amplified to a certain amplitude through the first amplifier 3, and applied to the first analog/digital converter 5.

And the temperature sensor 2 being a thermistor senses room temperature and outputs it in an electrical signal, which is amplified through the second amplifier 4 to a certain amplitude, and applied to the second analog/digital converter 6.

The first analog/digital converter 5 receives the analog signal sensed by the body sensor 1 through the first amplifier 3, converts it into a digital signal, and applies it to the computing part 8.

The second analog/digital converter 6 receives the analog signal sensed by the body sensor 1 through the second amplifier 4, converts it into a digital signal, and applies it to the computing part 8.

The computing part 8 receives the digital signals from the first, and second analog/digital converters 5 and 6 as well as the parameters depending on an amount of clothes a man wears and an amount of human activities from the parameter application part 7, and computes the received values into a PMV.

Herein, the parameters depending on an amount of clothes a man wears and an amount of activities of a man applied from the parameter application part 7 to the computing part 8 are values prepared by studying condition of clothes a man wears and condition of activities of a man, classified by seasons and times.

In this time, the computing part 8 performs a computation with a simple equation at receiving output signals of the body sensor 1 and the temperature sensor 2, to obtain a PMV value.

Figure 3:
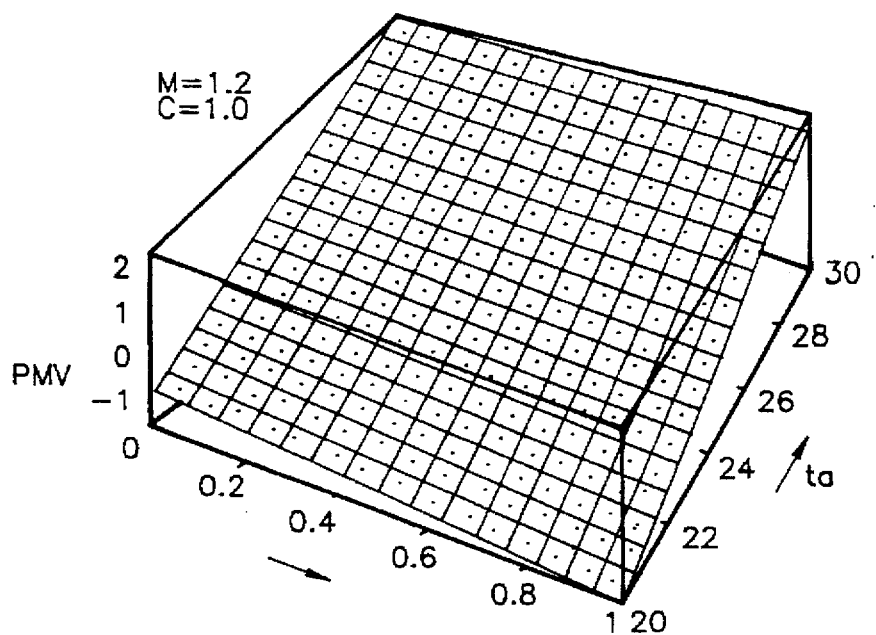
FIG. 3 shows an example of PMV values precisely measured for air circulations and temperatures.
Figure 4:
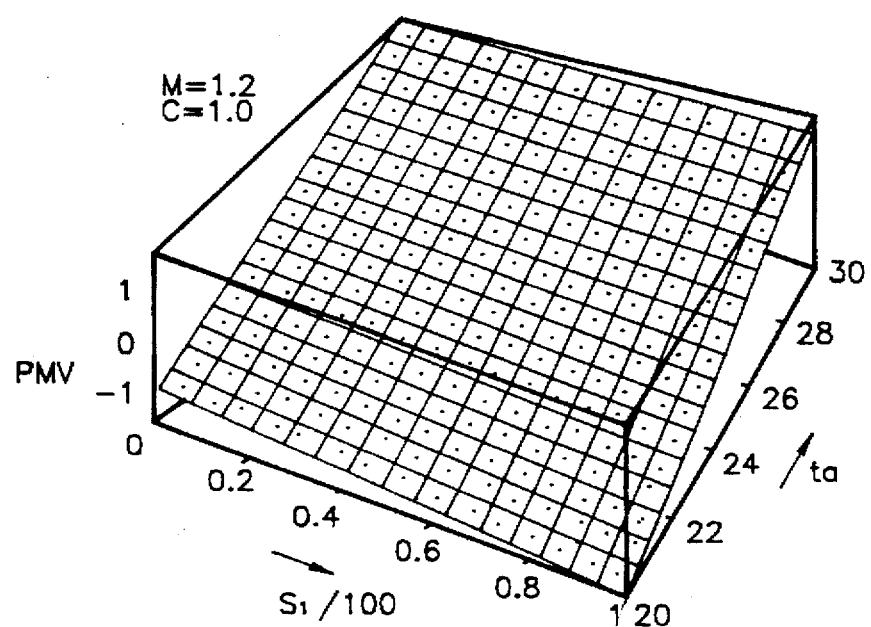
FIG. 4 shows an example of PMV values in accordance with this invention.

FIG. 3 shows PMV values calculated using equation (1) of Fanger vs. temperatures and air circulations at M=1.2, C=1, and FIG. 4 shows experimental PMV values calculated using equation (7) in accordance with this invention vs. temperatures and air circulations at $a_1$=0.15, $b_1$=0.15, $c_1$=0.4, $a_2$=0.75, $b_2$=0.6, $c_2$=−0.23, and K=8.75.

Referring to FIGS. 3 and 4, it can be seen that the PMV values obtained by the Fanger and the PMV values obtained using the body sensor in accordance with this invention are varying in a good similarity.

Referring to FIG. 3, it can be seen that the PMV values calculated by the Fanger equation at an identical temperature decreases as the air circulation increases, and increases as the air circulation decreases. For a room ambient, a man feels hot as the PMV value rises toward +3, feels cold as the PMV values drops toward −3, and feels comfortable at around zero.

On the other hand, referring to FIG. 4, it can be seen that, under a certain room temperature condition, the PMV values decreases as the signal values the body sensor has sensed becomes greater, and increases as the signal values the body sensor has sensed becomes smaller. And, the PMV value varies depending on the signal values received from the body sensor at an identical temperature.

Therefore, it can be understood that the PMV values in accordance with this invention simply calculated using the body sensor and the temperature sensor makes not so much difference compared to the PMV values calculated by the Fanger equation.

Figure 5:
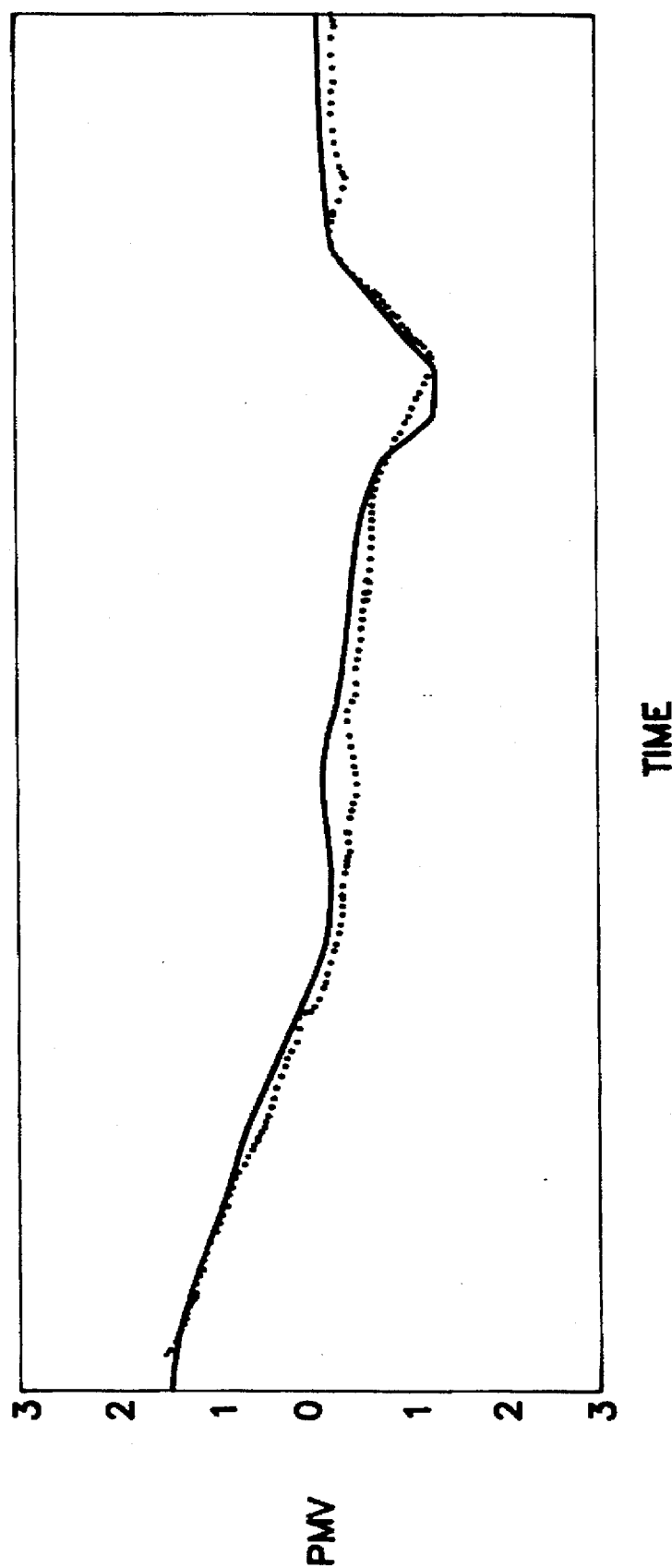
FIG. 5 is a graph comparing the precisely measured PMV values to the PMV values measured in accordance with this invention.

FIG. 5 is a graph showing PMV values precisely measured using a PMV measuring device while varying the ambient, such as outside temperature, flow and speed of cold air, and humidity under a mocking room thermal condition, and PMV values obtained in accordance with this invention.

Referring to FIG. 5, it can be known that most of the PMV values precisely measured using the PMV measuring instrument and the PMV values obtained in accordance with this invention are changing within maximum error of ±0.2.

The deviation between the PMV values precisely measured in dynamic state and the PMV values in accordance with this invention, is caused by the responsive characteristics, and they are proven to show almost same value in static state.

Calculation of each of the constants through simulation comparing FIGS. 3 and 4 result in to obtain following values.

$$a_1 = 0.05 - 0.3, \quad a_2 = 0.2 - 1$$
$$b_1 = 0.05 - 0.5 \quad b_2 = 0.1 - 0.9$$
$$c_1 = -0.8 - +0.8 \quad c_2 = -0.8 - +0.8$$
$$K = 7 - 10$$

Therefore, by detecting a change of a room ambient using the body sensor 1 and the temperature sensor, and by calculating a value for the change of the room ambient through applying the equation (7) with the constant within the ranges shown above applied, the computing part 8 can compute the PMV value good for comfortable air conditioning.

In case a PMV value is to be calculated, since this invention explained above can detect a room thermal ambient using the body sensor and the temperature, and can easily calculate the PMV value by using a simplified equation based on the detected room thermal ambient, this invention can be widely applicable to domestic air conditioners, H/A and B/A because the reduced amount of calculation allows not only the PMV value calculation done with only one memory chip, but also the system control done within the memory chip, an effect of energy saving of 15% compared to the simple control as well as realization of comfortable air conditioning as sudden temperature changes are prevented by temperature can be obtained by controlling the PMV using outputs of the body sensor and the temperature sensor.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A method for calculating a PMV for an air-conditioning system having a body sensor and a temperature sensor, the method comprising the steps of:

sensing a thermal change a human body senses due to room air circulation using the body sensor, and converting the sensed thermal change into a digital value;

sensing a room temperature using the temperature sensor, and converting the sensed room temperature into a digital value;

assigning parameters according to human bodily activities and amount of clothes being worn classified by seasons and times; and calculating a PMV using the value of thermal change converted into a digital value, the value of room temperature converted into a digital value, and the parameters, according to the following equation:

$$PMV = (a_1 M + b_1 C + c_1)ta - (a_2 M + b_2 C + c_2)S/100 - K$$

where,

M: metabolism,

C: resistivity coefficient of clothes (Clo) value, ta: room temperature,

S is the output of the body sensor, and a, b, c, and K are constants.

\* \* \* \* \*